United States Patent
Stolte et al.

(10) Patent No.: US 12,455,774 B1
(45) Date of Patent: Oct. 28, 2025

(54) EVENT-DRIVEN RESOURCE EXECUTION ARCHITECTURE

(71) Applicant: Citibank, N.A., New York, NY (US)

(72) Inventors: Robert Stolte, Jersey City, NJ (US); Stephen Saponara, Jersey City, NJ (US); Michael Hershkowitz, New York, NY (US); Gregory Vardi, New York, NY (US); Scott Wilson, Glasgow (GB)

(73) Assignee: CITIBANK, N.A., NY (US)

( * ) Notice: Subject to any disclaimer, the term of this patent is extended or adjusted under 35 U.S.C. 154(b) by 0 days.

(21) Appl. No.: 19/007,053

(22) Filed: Dec. 31, 2024

(51) Int. Cl.
*G06F 9/50* (2006.01)

(52) U.S. Cl.
CPC .................... *G06F 9/505* (2013.01)

(58) Field of Classification Search
CPC ........................................................ G06F 9/505
See application file for complete search history.

(56) References Cited

U.S. PATENT DOCUMENTS

| | | | |
|---|---|---|---|
| 2023/0230097 A1* | 7/2023 | Burnett | G06F 11/0745 707/703 |
| 2024/0242139 A1* | 7/2024 | Tang | G06Q 10/0633 |

* cited by examiner

Primary Examiner — Sisley N Kim
(74) Attorney, Agent, or Firm — Perkins Coie LLP

(57) ABSTRACT

Event-driven architecture for resource execution. In some aspects, the system receives a resource request and selects a workflow template to handle the request. Using the selected template, the system creates a first workflow instance that includes a first set of microservices. After executing some microservices, the system receives a modified resource request. The system pauses the first workflow instance, and based on the modified request, selects a different workflow template to handle the modified request. Using this template, the system creates a second workflow instance that includes a second set of microservices. However, before executing the modified request, the system identifies microservices that are common between the first and second sets. For these overlapping microservices, the system determines which outputs from the first set can be reused for the second set. The system initiates the second workflow instance to continue executing the modified request.

18 Claims, 9 Drawing Sheets

EVENT-DRIVEN RESOURCE EXECUTION ARCHITECTURE

BACKGROUND

In the realm of distributed computer systems, resource allocation is a critical function that ensures the efficient and effective use of available resources. Traditional approaches to resource allocation often involve manual processes and disparate systems, leading to significant challenges in standardizing procedures and ensuring compliance with policy requirements. These challenges are particularly pronounced in large-scale systems where multiple units and geographical locations are involved. One of the primary issues with conventional resource allocation methods is the lack of a unified system. This fragmentation results in inefficiencies, as different units may follow varying procedures and standards. The absence of a standardized approach can lead to inconsistencies in resource management policies, making it difficult to maintain uniformity across the system. Furthermore, the reliance on manual processes increases the likelihood of human error, which can further exacerbate these inconsistencies and lead to management issues.

Figure 1:
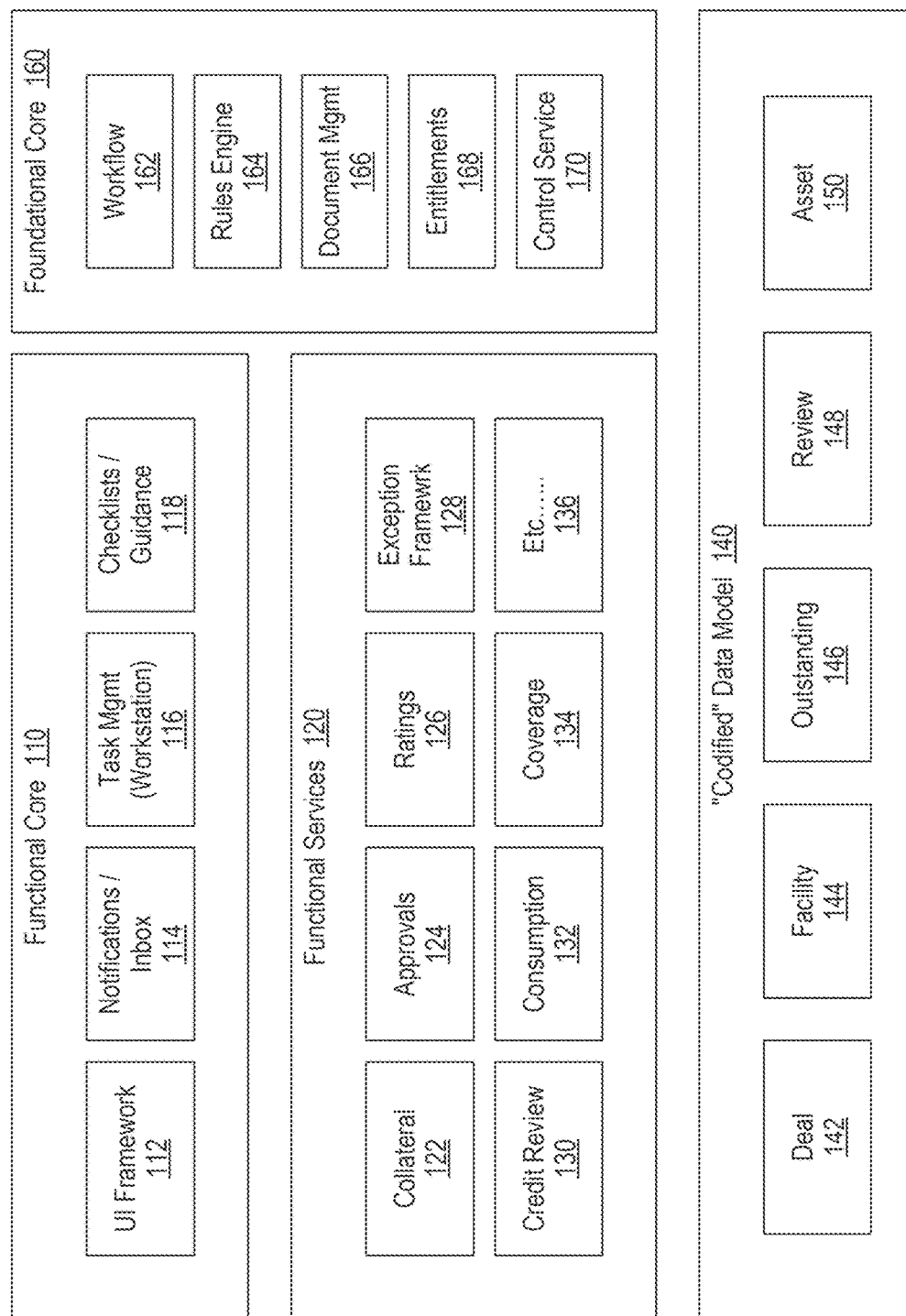
FIG. 1 is a block diagram showing some of the components typically incorporated in the disclosed system in accordance with some implementations of the present technology.

The drawings have not necessarily been drawn to scale. For example, the relative sizes of signaling periods in the figures are not to scale, and the size of certain signaling or messaging periods may differ. Similarly, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

The systems and methods disclosed herein are directed to an event-driven architecture for executing a process for fulfilling resource requests. The system receives a resource request with several parameters having specific details. Based on these details, the system (e.g., using a rules engine) selects a suitable workflow template from a set of available templates to handle the request. Using the selected template, it creates a specific workflow instance that includes a first set of microservices to execute the resource request.

In some implementations, after executing some of these microservices, the system may receive a modified resource request with new details. In such cases, the system may notify a user or another system, and based on the new details, may incorporate the new data change into the inflight workflow instance or dynamically generate additional workflow nodes or change existing workflow nodes. That workflow instance may revert some of the work already done if it conflicts with this request change and reroute the workflow path to ensure proper completion. In some implementations, the system may pause the running (parent) workflow and conditionally (e.g., using a rules engine) trigger a child (or orphan) workflow based on a different template which effectively creates a second workflow instance with a second set of microservices to execute the request. Some or all work thus far completed by the first set of microservices may be utilized by the second set of microservices within the second running workflow instance. Once the second workflow instance completes its work, control may be passed back to the initial (parent) workflow to resume its work based on the initial template which was originally triggered. In some implementations, every active workflow may generate real-time events allowing for monitoring and tracking of resources and progress.

In some implementations, the system may select a different workflow template from the available templates to handle the modified request. Using the new template, it creates a new workflow instance that includes a second set of microservices to execute the modified request. However, before executing the modified request, the system may identify microservices that are common between the first and second workflow instances. For these overlapping microservices, the system may determine which outputs from the first set of microservices can be reused in the second set, preventing the need to re-execute those microservices. It also may identify outputs from the first set of microservices that cannot be reused and discard them. Subsequently, the system may initiate the second workflow instance to continue executing the modified resource request. When overlapping microservices are identified, the system may continue executing the modified resource request without re-executing the microservices of the first set of microservices that overlap the second set of microservices.

Conventional approaches to resource allocation in large-scale systems face significant challenges in standardizing processes and ensuring regulatory compliance. The lack of a unified system leads to inefficient resource utilization and allocation, regulatory data discrepancies, and inconsistent resource management policies. This is further exacerbated by disparate systems and manual processes, which hinder effective risk management and compliance efforts. Finally, when regulatory issues arise, significant resources are spent gathering data and ensuring compliance manually.

Implementing such a unified platform can be highly beneficial, but it also comes with several technical challenges. From a technical perspective, integrating data from various systems used in different business units and countries can be complex. Ensuring data consistency and accuracy across these different systems is crucial for reliable compliance and risk management. Additionally, handling large volumes of data generated throughout the process can be challenging, especially in large-scale systems where multiple units are involved. Developing a centralized rules engine that accurately manages credit policies and transaction approvals also requires extensive validation and testing.

Therefore, the technical problem addressed by the disclosed systems and methods is the inefficiency and inconsistency in resource utilization and allocation and workflow management due to human variability, which leads to errors, lack of standardization, and compliance issues. The disclosed systems and methods provide a systematic and automated solution by using workflow templates and microservices to handle resource requests consistently and in an auditable manner. This process involves receiving a resource request, selecting a suitable workflow template, creating a workflow instance, and reusing outputs where possible. The disclosed systems and methods cannot be performed in the human mind because they require handling complex and dynamic processes responsible for correct routing, ensuring consistency and auditability, and improving efficiency through automation. The disclosed systems and methods offer a technical solution to a technical problem by imposing systematic rules and policies through an automated system, ensuring compliance, and eliminating the inefficiencies of manual processing.

The systems and methods discussed herein provide for a unified platform with standardized resource management policies, a centralized data model, a centralized rules engine, centralized control services, and an orchestration and choreography engine to streamline the resource allocation process. This platform answers questions such as how to standardize policies across business units, how to ensure regulatory compliance, and how to manage the resource allocation process efficiently. The proposed event-driven, functionalized architecture includes all functional capabilities required for resource allocation processes as a set of stateless, scalable services. The centralized rules engine standardizes and reuses credit policies, pulling logic out of code and embedding it into the rules engine. This rules engine can handle various scenarios, such as transaction approvals based on size and jurisdiction, and control rules for loan terms. Further, the orchestration engine can be used for process orchestration and human workflow orchestration. This orchestration engine would act as a platform with foundational components such as notification services and documentation services. Developers would use these platform components, ensuring a common ecosystem for all global stakeholders. Finally, data standardization is another significant benefit, providing a common set of inputs and validations while enforcing adherence to a common data model with referential integrity to an institution's master data and strategic static data across the institution. The architecture would eliminate the need for extract, transform, load (ETL) processes, ensuring data consistency at the physical layer as the data model would be provided alongside the data to any users, e.g., consumers. The user interface and experience (UI/UX) would be built dynamically (e.g., using a micro front end approach) off the workflow engine, providing a common language and framework for users. The platform also includes mechanisms (e.g., automated event-driven control services) for regulatory compliance and risk management, offering actionable recommendations and establishing a backward, event-based view of actions for full auditability and traceability of all changes and decisions made throughout the resource allocation process.

Developing a system that provides a unified platform for resource allocation in a distributed computer system presented significant technological uncertainty. One significant challenge was determining how to integrate disparate data sources from various systems used across different business units and geographical locations. Each of these systems has its own data structures, formats, and update frequencies, making it difficult to ensure data consistency and accuracy across an entire organization or ecosystem, e.g., set of interfacing organizations. The complexity was further compounded by the need to handle large volumes of data generated by multiple resource allocation requests within a large organization or ecosystem. Ensuring that this data could be aggregated, analyzed, and presented in a coherent and actionable manner required overcoming substantial technical hurdles.

Another area of technological uncertainty was the development of a centralized rules engine capable of accurately managing resource allocation policies and transaction approvals. This development required extensive validation and testing to ensure the rules engine could handle various scenarios, such as approvals for transactions of varying sizes and in various jurisdictions as well as varying control rules for resource terms. The inherent variability and complexity of resource allocation processes meant that the rules engine had to be highly adaptable and capable of learning from a wide range of scenarios. Additionally, the system needed to generate a graphical user interface that could present this information in a coherent, user-friendly manner, which involved significant challenges in terms of data visualization and user experience design.

The inventors also faced technological uncertainty in developing a mechanism for reusing outputs from microservices across different workflow instances. A robust mechanism for tracking and logging every action and event within varying workflow instances, in which such actions and events could then be analyzed to identify reusable outputs, had to be developed. Particularly challenging was the creation of a system that could not only capture this data in real-time but also process and analyze it efficiently to provide meaningful insights. This involved experimenting with various logging frameworks and data processing pipelines to ensure that the system could handle the high volume and velocity of data generated in a large enterprise environment.

To address these uncertainties, the inventors systematically evaluated multiple design alternatives. For instance, they experimented with different data integration techniques to ensure seamless data flow between various systems. One approach involved using middleware to standardize data formats before integration, but this proved to be inefficient due to the high volume of data and the dynamic nature of resource allocation activities. Another alternative was to implement real-time data synchronization mechanisms, which required sophisticated algorithms to handle data conflicts and ensure consistency. The inventors also tested various rules engine algorithms, including rule-based and machine learning techniques, to identify the most effective models for managing resource allocation policies and transaction approvals. Each of these alternatives presented its own set of challenges and required iterative testing and refinement to achieve the desired level of accuracy and reliability.

In some aspects, the system may implement a universal workflow platform that provides the above-mentioned functionality. The system receives a resource request and selects a workflow template to handle the request. Using the selected template, the system creates a first workflow instance that includes a first set of microservices. After executing some microservices, the system receives a modified resource request. The system pauses the first workflow instance, and based on the modified request, selects a different workflow template to handle the modified request. Using this template, the system creates a second workflow instance that includes a second set of microservices. However, before executing the modified request, the system may identify microservices that are common between the first and second sets of microservices. For these overlapping microservices, the system may determine which outputs from the first set can be reused for the second set. The system initiates the second workflow instance to continue executing the modified request. When overlapping microservices are identified, the system may continue executing the modified resource request without re-executing the microservices of the first set of microservices that overlap the second set of microservices.

Overview

Wholesale lending practices across various countries and business units can be inconsistent, leading to inefficiencies and potential regulatory issues. The need for a standardized approach is critical to ensure uniformity and compliance across all operations. The disclosed systems and methods address these challenges by providing a comprehensive solution that standardizes credit policies, operating models, and technology architectures within a financial institution. In some aspects, the disclosed systems and methods comprise an event-driven, functionalized architecture with microservices, a centralized rules engine, a workflow orchestration engine, and a standardized data model. The system is designed to be highly configurable and adaptable for future enhancements. Key components include a rules engine that may utilize Boolean logic and integrate with advanced technologies, such as machine learning and artificial intelligence, and a dynamic workflow engine capable of generating processes based on user inputs and external data.

Example Distributed System(s)

FIG. 1 is a block diagram 100 showing some of the components typically incorporated in the disclosed system in accordance with some implementations of the present technology. To solve the technical problems described herein, the inventors have conceived and reduced to practice a computing system leveraging an event-driven architecture for executing processes for fulfilling resource requests. According to various embodiments, the system described herein utilizes machine learning models and/or other techniques to enable such a universal workflow platform within an organization.

As shown, the system includes common reusable components such that business activities can be executed via the same core components. The system includes functional core components 110, including, for example, UI Framework component 112, notifications component 114, task management component 116, and checklists component 118. The system further includes functional services components 120, including, for example, collateral component 122, approvals component 124, ratings component 126, exception framework component 128, credit review component 130, consumption component 132, coverage component 134, and other components 136. The functional services may implement business activities that only need to be coded once. The system further includes codified data model components 140, including, for example, deal component 142, facility component 144, outstanding component 146, review component 148, and asset component 150. The codified data model may capture one version of the truth such that data is captured by the right actor at the right time and reused through the process with full auditability. The system further includes foundational core components 160, including, for example, workflow component 162, rules engine component 164, document management component 166, entitlements component 168, and control service component 170. The provided functionality is configurable such that changes to rules, workflows, checklists, and guidance can be done quickly and without code changes. All personas involved in a resource allocation process, e.g., extension and utilization of credit, performed by the system operate in the same platform.

A rules engine applied in the described system can be based on various types of technologies, each offering different capabilities and advantages. One common approach is to use Boolean rules, which involve simple true/false conditions. Boolean rules are straightforward to implement and understand, making them suitable for scenarios where the rules are clear-cut and do not require complex decision-making processes. For example, a Boolean rule might be applied in which if a loan amount is greater than $500,000, then additional approval is required, or if a borrower's credit score is below 600, then a loan application should be rejected.

Another approach is to use Bayesian models, which employ probability to make decisions based on prior knowledge and evidence. Bayesian models are useful for handling uncertainty and making decisions with incomplete information. For instance, a Bayesian model could calculate the probability of loan default based on historical data and current borrower information, adjusting the risk assessment dynamically as new information becomes available.

Machine learning models are also a powerful option for the rules engine. These models can learn from historical data to make predictions and decisions, identifying patterns and making complex decisions that are not easily captured by simple rules. For example, a machine learning model might predict the likelihood of a loan approval based on past loan applications and their outcomes or identify potential fraud by analyzing transaction patterns and borrower behavior.

Generative AI models, such as those based on neural networks, can generate new data or make decisions based on learned patterns. These models are particularly effective for handling complex and dynamic scenarios. For example, a generative AI model utilized in the disclosed system could generate personalized loan offers based on borrower profiles and market conditions or create dynamic risk assessment models that adapt to changing economic conditions.

In many cases, a hybrid approach that combines multiple technologies can be the most effective. For example, a rules engine might use Boolean rules for straightforward decisions, Bayesian models for handling uncertainty, and machine learning for complex predictions. In the context of the described system, the rules engine component 164 can be implemented using any of these technologies, depending on the specific requirements and complexity of the resource allocation process. The choice of technology will depend on factors such as the nature of the rules, the availability of historical data, and the need for adaptability and scalability.

For example, the system may include common reusable components that allow business activities to be executed via the same core components. The functional core components 110 may include UI Framework component 112, which provides a standardized user interface framework to create consistent and user-friendly interfaces across different applications. In this manner, user interactions with the system are intuitive and follow a common design language, enhancing the user experience and reducing the learning curve for new users. The notifications component 114 may handle the generation and delivery of notifications to users so that they are promptly informed about important events, updates, or actions required. Notifications can be delivered through various channels, such as email, SMS, or in-app alerts, depending on user preferences and the nature of the notification. The task management component 116 may facilitate the creation, assignment, tracking, and completion of tasks, helping to organize and manage tasks efficiently and ensuring that all necessary actions are taken in a timely manner. The checklists component 118 may provide a mechanism for creating and managing checklists, which are essential for ensuring that all necessary steps are followed in a process, reducing the risk of errors and omissions.

For example, the system may include functional services components 120 that may implement specific business activities that only need to be coded once, making them highly reusable and efficient. These components may include a collateral component 122 for managing collateral information, which is crucial for securing loans and other financial transactions, and an approvals component 124 for handling the approval processes for various transactions and requests, providing a structured and efficient process for obtaining any and all necessary approvals. The ratings component 126 may manage the ratings of various entities, such as customers, products, or services, which are essential for assessing risk, making informed decisions, and maintaining compliance with regulatory requirements. The exception framework component 128 may provide a framework for handling exceptions that occur during business processes, ensuring that exceptions are managed systematically, minimizing disruptions, and ensuring that appropriate actions are taken to resolve issues. The credit review component 130 may facilitate the review of credit applications and transactions, ensuring that all necessary checks and assessments are performed to evaluate creditworthiness and mitigate risk. The consumption component 132 may track the consumption of resources, such as credit or financial assets, ensuring that resource usage is monitored and managed effectively. The coverage component 134 may manage coverage information to assess risk exposure and to ensure that adequate coverage is in place for various transactions.

For example, the system may include codified data model components 140 that may capture and maintain a single version of the truth, ensuring data consistency and auditability. These components may include a deal component 142 for managing information related to deals, such as contracts, agreements, and transactions, and a facility component 144 for managing information related to facilities, such as loans, credit lines, and other financial arrangements. The outstanding component 146 may track outstanding amounts, such as unpaid loans or credit balances, ensuring that any and all outstanding amounts are accurately recorded and monitored. The review component 148 may facilitate the review of various transactions and processes, ensuring that any and all necessary reviews are performed systematically and efficiently. The asset component 150 may manage information related to assets, such as property, equipment, or financial instruments such that any and all asset-related data is accurately recorded and maintained.

For example, the foundational core components 160 may provide the underlying infrastructure and services that support the entire system. These components may include a workflow component 162 for managing the execution of workflows, ensuring that any and all necessary steps are followed in a structured and efficient manner, and a rules engine component 164 for managing the execution of business rules, ensuring that all transactions and processes adhere to predefined policies and regulations. The document management component 166 may manage the storage, retrieval, and management of documents, ensuring that all necessary documents are accurately recorded and maintained, providing easy access and ensuring compliance with regulatory requirements. The entitlements component 168 may manage user entitlements, ensuring that users have appropriate access to resources and information, providing a mechanism for controlling access and ensuring security. The control service component 170 may provide various control services, such as monitoring, auditing, and reporting, ensuring that all processes are executed in a controlled and auditable manner, providing transparency and accountability.

The system's components and functionality may be highly configurable, allowing changes to rules, workflows, checklists, and guidance to be made quickly and without code changes. This flexibility ensures that the system can adapt to changing business needs and regulatory requirements. All personas involved in the resource allocation process, such as extension and utilization of credit, operate within the same platform, ensuring consistency and collaboration across the organization.

Method(s) of Operation of the Example Distributed System(s)

Figure 2:
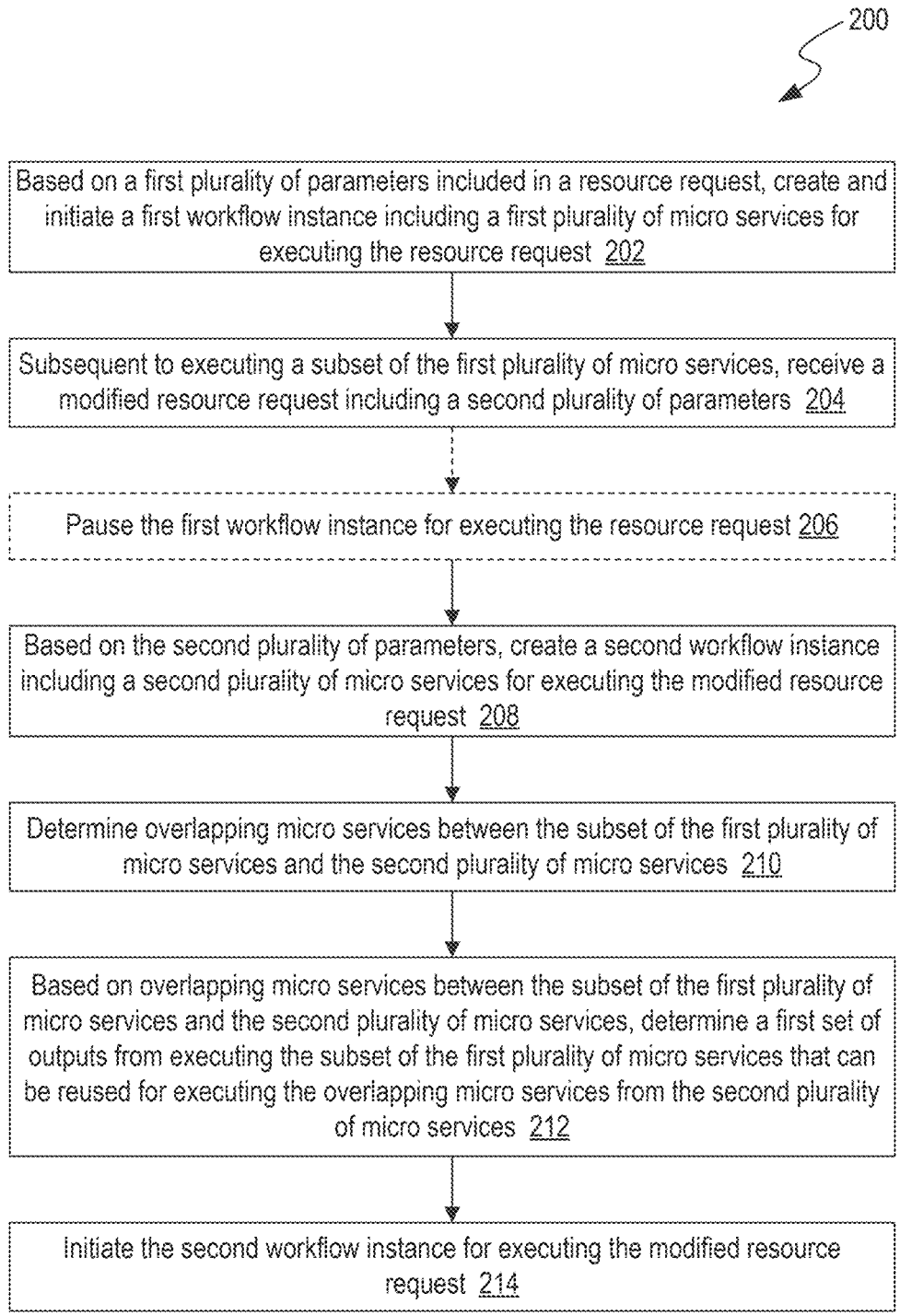
FIG. 2 is a flow diagram illustrating an example process for executing resource requests by the disclosed system in some implementations of the present technology.

FIG. 2 is a flow diagram illustrating example process 200 for executing resource requests by the disclosed system in some implementations of the present technology. For example, some or all operations of process 200 can be performed and/or controlled by computing environment 800 (see FIG. 8) or another suitable system, either alone or in combination with other system(s).

At 202, the disclosed system, based on a first plurality of parameters included in a resource request, creates a first workflow instance including a first plurality of microservices for executing the resource request. For example, a user may request additional computational resources to handle a spike in data processing needs. The resource request might include parameters such as the type of resources needed (e.g., CPU, memory), the quantity, and the duration for which the resources are required. Based on these parameters, the system selects a suitable workflow template and creates a workflow instance that includes microservices for provisioning the requested resources, configuring them, and integrating them into the existing infrastructure. In another example, in the context of wholesale lending, a bank might receive a loan request from a corporate client. The loan request could include parameters such as the loan amount, interest rate, repayment period, and collateral details. Based on these parameters, the system (e.g., using the rules engine component 164) selects a suitable workflow template and creates a workflow instance that includes microservices for credit assessment, collateral evaluation, and loan approval (e.g., using the credit review component 130, the collateral component 122, and the approvals component 124).

In some implementations, the disclosed system when employed in process 200 and based on the first plurality of parameters, selects, from a plurality of workflow templates, a first workflow template suitable for executing the resource request. The disclosed system when employed in process 200 creates, based on the first workflow template, a first workflow instance including a first plurality of microservices for executing the resource request. For example, in the wholesale lending context, a bank may receive a loan request with parameters such as the loan amount, interest rate, and repayment period. The system, using the rules engine component 164, analyzes these parameters and selects a suitable workflow template from a set of available templates. This selected template is designed to handle the specific requirements of the loan request. Based on this template, the system creates a workflow instance that includes a first plurality of microservices necessary for processing the loan application. These microservices might include the collateral component 122 for managing collateral information, the approvals component 124 for handling the approval processes, and the ratings component 126 for managing credit ratings. By selecting the appropriate workflow template and creating a tailored workflow instance, the system ensures that the loan request is processed efficiently and accurately, leveraging the predefined processes and rules embedded in the workflow template.

In some implementations, the disclosed system when employed in process 200 dynamically generates the first workflow template based on the resource request, including determining the first plurality of microservices based on the first plurality of parameters included in the resource request. For example, in the wholesale lending context, a bank may receive a complex loan request that does not fit any predefined workflow templates. The loan request might include parameters such as a high loan amount, a unique repayment structure, and specific collateral requirements. The system, using the rules engine component 164, analyzes these parameters and dynamically generates a custom workflow template tailored to the specific needs of the loan request. In this case, the system might determine that the first plurality of microservices should include specialized components for handling the unique aspects of the loan. For instance, the dynamically generated workflow template could include the collateral component 122 to manage the specific collateral requirements, the approvals component 124 to handle multiple levels of approval due to the high loan amount, and the ratings component 126 to assess the creditworthiness of the borrower. Additionally, the workflow template might include the credit review component 130 to perform an in-depth analysis of the borrower's financial health and the exception framework component 128 to manage any deviations from standard lending practices. By dynamically generating the workflow template, the system ensures that all necessary steps are included to process the loan request efficiently and accurately. This approach allows the system to handle complex and unique loan requests that do not fit into predefined templates, providing a flexible and adaptive solution for wholesale lending. For example, if the loan request involves a borrower with a complex financial history, the system might include additional microservices for detailed financial analysis and risk assessment, ensuring that the loan is processed with a comprehensive analysis of the borrower's financial situation.

At 204, the disclosed system, subsequent to executing a subset, e.g., only a subset, of the first plurality of microservices, receives a modified resource request including a second plurality of parameters. For example, after the initial resource request has been partially fulfilled, the company might realize that they need additional resources or a different configuration due to unforeseen changes in their workload. The modified resource request might include new parameters such as an increased or a decreased quantity of resources or a different type of resource. This modified request necessitates a change in the workflow template to accommodate the new requirements. In another example, in the context of wholesale lending, after the initial loan request has been partially processed, the corporate client might request changes to the loan terms, such as an increased loan amount or a different repayment schedule. The modified loan request would include new parameters that need to be processed by the system.

At 206, which may be optional, the disclosed system pauses the first workflow instance for executing the resource request. For example, the system temporarily halts the execution of the current workflow instance to prevent any conflicts or redundant operations while it processes the modified resource request. This pause ensures that the system can re-evaluate the requirements and adjust the workflow accordingly without causing disruptions or inconsistencies. In another example, in the context of wholesale lending, the system pauses the initial workflow instance that was processing the original loan request. This pause allows the system to re-evaluate the new loan parameters and adjust the workflow accordingly.

At 208, the disclosed system, based on the second plurality of parameters, creates and following creation may later initiate a second workflow instance including a second plurality of microservices for executing the modified resource request. For example, the system analyzes the new parameters and selects a different workflow template that better suits the updated requirements. It then creates a new workflow instance that includes microservices for provisioning additional resources that are needed, reconfiguring existing resources, and ensuring that the overall system remains stable and efficient. In another example, in the context of wholesale lending, the system analyzes the new loan parameters and selects a different workflow template that better suits the updated loan request. It then creates a new workflow instance that includes microservices for re-evaluating the creditworthiness of the client, reassessing the collateral, and updating the loan approval process.

At 210, the disclosed system determines overlapping microservices between the subset of the first plurality of microservices and the second plurality of microservices. For example, the system identifies which microservices from the initial workflow instance are still relevant and can be reused in the new workflow instance. The identified microservices might include those that handle basic provisioning tasks, resource monitoring, or configuration management, which are common to both the initial and modified resource requests. In another example, in the context of wholesale lending, the system identifies which microservices from the initial workflow instance are still relevant and can be reused in the new workflow instance. These identified microservices might include those that handle basic credit checks, customer information verification, or document generation, which are common to both the initial and modified loan requests. In this example, the system uses the control service component 170 to manage these overlapping microservices.

In some implementations, the disclosed system when employed in process 200, using a machine learning model, obtains user input to assess overlapping microservices between the first plurality of microservices and the second plurality of microservices. For example, in the wholesale lending context, a loan processing system of or used by a bank may need to handle a modified loan request. Initially, the system creates a workflow instance with a set of microservices to process the loan application. However, after a subset of these microservices has been executed, the borrower submits a modified loan request with new parameters, necessitating the creation of a second workflow instance. To efficiently manage this transition, the disclosed system employs a machine learning model to analyze the user input and assess which microservices from the first workflow instance can be reused in the second workflow instance. For example, the system may present a series of questions to the loan officer or system administrator, e.g., via a graphical user interface (GUI), a speaker, or other communication medium, to gather detailed input on the potential overlaps. For instance, the system might ask questions such as: "Has the borrower's creditworthiness changed since the initial request?"; "Are the collateral details still valid for the modified loan request?"; or "Do the initial documentations need to be updated or can they be reused?" The machine learning model uses the responses to these questions to identify patterns and determine which microservices are commonly reused. For example, if the user indicates that the borrower's creditworthiness has not changed and the collateral details remain the same, the model might suggest reusing the credit check and collateral evaluation microservices. The system, via the model and the communication medium, would then present these findings to the user for confirmation, ensuring that the system efficiently reuses existing outputs and minimizes redundant processing. This approach leverages the power of machine learning to enhance the decision-making process, ensuring that the system can adapt to changes in loan requests while maintaining efficiency and accuracy. By incorporating user input through a series of targeted questions via the communication medium, the system can account for specific nuances and expert knowledge, further improving the overall effectiveness of the workflow management process.

In some implementations, the disclosed system when employed in process 200 determines microservices whose output does not change based on the second plurality of parameters for the modified resource request. For example, in the wholesale lending context, a loan processing system of or used by a bank may initially create a workflow instance to process a loan application. This workflow instance includes microservices for tasks such as credit checks, collateral evaluation, and document generation. After a subset of these microservices has been executed, the borrower submits a modified loan request with new parameters, such as an increased loan amount and a different repayment period. To efficiently handle the modified request, the disclosed system analyzes the second plurality of parameters to determine which outputs of the microservices remain unchanged. For instance, the system might identify that the credit check microservice's output, which includes the borrower's credit score and history, does not change because the borrower's creditworthiness remains the same despite the modified loan amount and repayment period. Similarly, the collateral evaluation microservice's output, which includes the assessed value of the collateral, might also remain unchanged if the collateral itself has not been altered. By identifying these microservices, the disclosed system can reuse the unchanged outputs of these microservices in the second workflow instance, avoiding redundant processing and saving time. For example, the system can reuse the credit check report and the collateral evaluation report from the initial workflow instance, ensuring that these steps do not need to be repeated. This approach not only improves efficiency but also ensures consistency in the processing of the loan request. In this way, the disclosed system when employed in process 200 leverages the stability of certain microservices' outputs to streamline the handling of modified resource requests, ensuring that only the necessary steps are re-executed while maintaining the integrity and accuracy of the overall process.

At 212, the disclosed system, based on overlapping microservices between the subset of the first plurality of microservices and the second plurality of microservices, determines a first set of outputs generated by executing the subset of the first plurality of microservices that can be reused for executing the overlapping microservices from the second plurality of microservices. In some implementations, the disclosed system assigns the first set of outputs to the overlapping microservices from the second plurality of microservices, thereby preventing execution of the overlapping microservices. For example, the system evaluates the outputs generated by the microservices in the initial workflow instance and determines which of these outputs are still valid and can be reused in the new workflow instance. These generated outputs might include configuration files, resource allocation records, or monitoring data that do not need to be regenerated, thus saving time and computational resources. In another example, in the context of wholesale lending, the system evaluates the outputs generated by the microservices in the initial workflow instance and determines which of these outputs are still valid and can be reused in the new workflow instance. These generated outputs might include credit check results, customer information, or initial loan documentation that do not need to be regenerated, thus saving time and resources. The document management component 166 ensures that all necessary documents are accurately recorded and maintained.

In some implementations, the disclosed system when employed in process 200 determines a second set of outputs generated by executing the subset of the first plurality of microservices that cannot be reused for executing the overlapping microservices from the second plurality of microservices. In such implementations, the system discards the second set of outputs generated by executing the subset of the first plurality of microservices. For example, continuing with the wholesale lending context, after identifying the microservices whose outputs remain unchanged and can be reused, the system also may determine which outputs cannot be reused due to the changes in the loan request parameters. In some examples of these implementations, the initial loan request may include a microservice for generating a loan offer document based on the original loan amount and repayment period. With the modified loan request, the loan amount may have increased, and/or the repayment period may have changed. As a result, the output of the loan offer document generation microservice, which includes specific terms and conditions based on the initial parameters, cannot be reused because it no longer reflects the updated loan terms. The disclosed system when employed in process 200 identifies this output as part of the second set of outputs that cannot be reused. Consequently, the system discards the initial loan offer document and prepares to generate a new document that accurately reflects the modified loan request.

Similarly, if there was a microservice that calculated the monthly repayment schedule based on the initial loan parameters, its output would also be discarded, as the new loan amount and repayment period would require a recalculated schedule. By discarding the second set of outputs, the system via process 200 ensures that only relevant and accurate information is used in the second workflow instance. This approach prevents the use of outdated or incorrect data, maintaining the integrity and accuracy of the loan processing. The system then proceeds to execute the necessary microservices in the second workflow instance to generate the updated outputs, such as the new loan offer document and the revised repayment schedule, ensuring that the modified loan request is processed correctly and efficiently.

At 214, the disclosed system initiates the second workflow instance for executing the modified resource request. For example, after determining the reusable outputs and integrating them into the new workflow instance, the system initiates the execution of the new workflow, e.g., via an available or custom new workflow template. This new workflow ensures that the modified resource request is fulfilled efficiently, leveraging the work already done in the initial workflow instance and minimizing redundant operations. In another example, in the context of wholesale lending, after determining the reusable outputs and integrating them into the new workflow instance, the system initiates the execution of the new workflow. This new workflow ensures that the modified loan request is processed efficiently, leveraging the work already done in the initial workflow instance and minimizing redundant operations. The entitlements component 168 manages user access to the workflow, ensuring that all stakeholders can collaborate effectively.

In some implementations, subsequent to completing the second workflow instance, the system may resume the first workflow instance. For example, once the second workflow instance completes its work, control may be passed back to the initial (parent) workflow to resume its work based on the initial template which was originally triggered.

In some implementations, the disclosed system via process 200 produces a final output that includes a uniform and clear statement on a state of available resources for servicing resource requests, a request history of a user submitting the resource request, and an account status of the user in anticipation of executing the resource request. For example, in the context of wholesale credit analysis, the final outcome may include a uniform and clear statement on three critical items: considerations of external factors, the creditworthiness of the borrower, and risk mitigation and collateral. Firstly, the statement addresses considerations of external factors, which include an analysis of the external environment affecting the borrower, such as geographical, macroeconomic, and industry-specific conditions. For instance, if the borrower operates in a region experiencing economic growth, this positive external factor would be highlighted in the statement. Secondly, the statement explains the creditworthiness of the borrower, detailing why the lender expects the borrower to repay the loan. This includes an assessment of the borrower's financial health, credit history, and repayment capacity. For example, if the borrower has a strong credit score and a history of timely repayments, this information would be detailed here. Lastly, the statement outlines risk mitigation and collateral, describing the measures in place to mitigate risk in case of default, including the collateral provided and its expected coverage. For example, if the borrower has pledged valuable real estate as collateral, the statement would describe the collateral's value and how it covers the loan amount, reducing the overall risk. By having a uniform process and standardized GUIs, the system ensures that the final output is comprehensive and consistent. The system collects and integrates all relevant information through a series of well-defined steps and user inputs, ultimately producing a package that provides a clear and detailed statement on the state of available resources, the user's request history, and the account status. This uniform approach helps stakeholders make informed decisions based on a complete and accurate representation of the resource request and the associated risks and considerations.

Feature(s) of the Example Distributed System(s)

Figure 3:
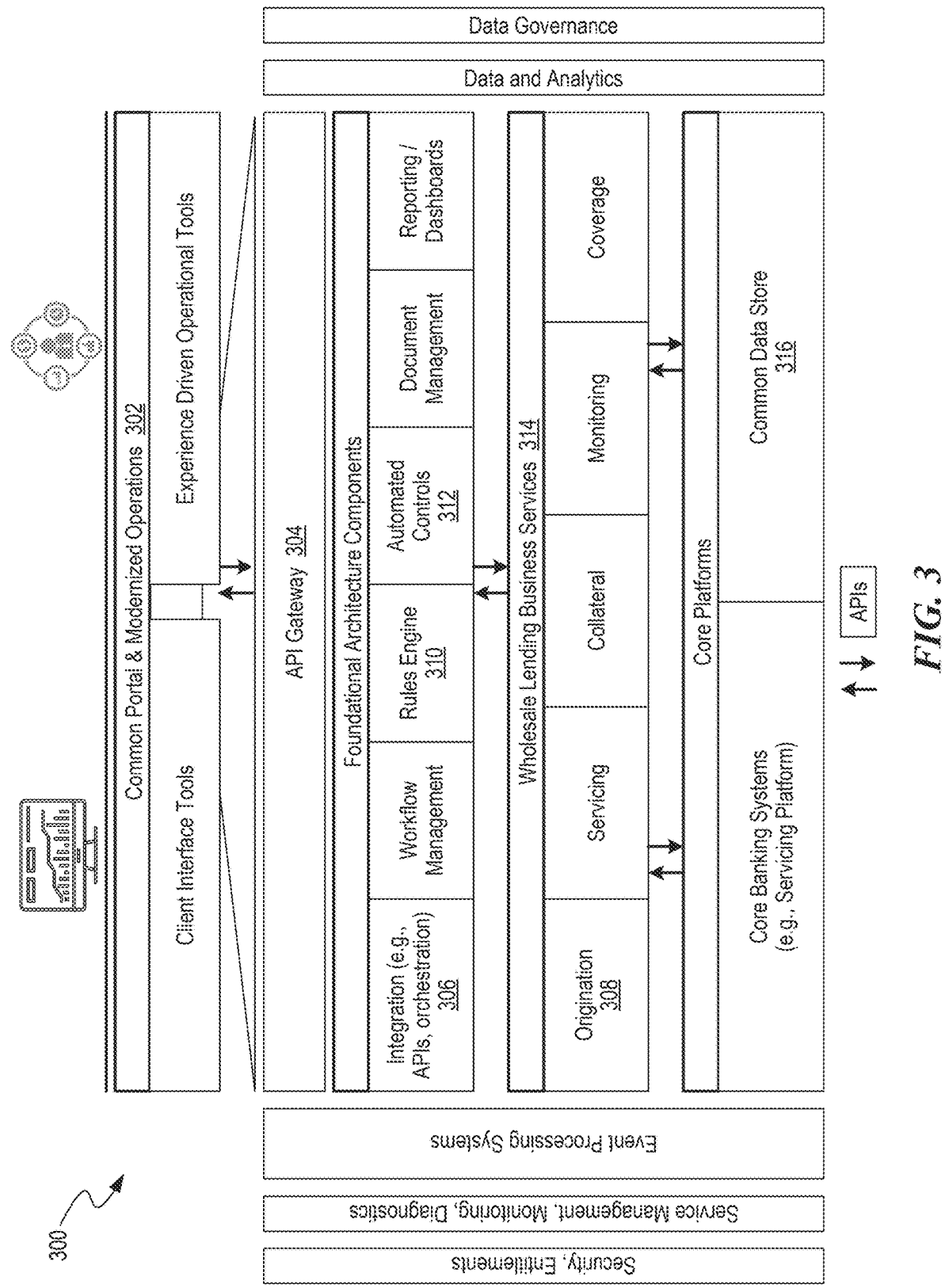
FIG. 3 is a block diagram illustrating example data flow for a universal workflow platform in some implementations of the present technology.

FIG. 3 is a block diagram 300 illustrating an example data flow for a universal workflow platform in some implementations of the present technology. The diagram is presented specifically within the context of wholesale lending. Deploying a modern architecture is foundational to implementing system enhancements and improving user experience. The diagram highlights the key components and how they support essential business services. The common experience component 302 ensures a consistent user experience across internal operational activities and client interface tools, modernizing and streamlining work across various capabilities. For example, a loan officer and a client both interact with a unified interface that simplifies the loan application and approval process. The integrated ecosystem and scalable platform component 304 includes embedded workflows and integration capabilities that provide a holistic view and improve the accessibility of information and documentation. For instance, all relevant loan documents and borrower information are easily accessible within the platform, facilitating better decision-making. The streamlined routing with integrated workflows component 306 ensures accurate and efficient operations by auto-balancing queues and approvals. For example, loan applications are automatically routed to the appropriate reviewers via the integrated workflows component 306 based on workload and expertise, ensuring timely processing. The digital intake component 308 handles the required documentation for the process, such as agreements, valuations, and appraisals. For instance, borrowers can upload necessary documents directly through the platform, which are then automatically categorized and stored via the digital intake component 308. The rules engine component 310 leverages rules-based logic to automate the population of information, improving efficiency and removing manual interpretation from the process. For example, the system automatically fills in borrower details and loan terms based on predefined rules via the rules engine component 310, reducing the risk of errors. The embedded controls component 312 is automatically executed throughout operations, enabling data validation, rules-based checklists, and approvals. For instance, the system checks the eligibility of a borrower against predefined criteria and flags any discrepancies for review via the embedded controls component 312. The functional services component 314 supports key capabilities and products, integrated across core banking systems, data stores, and foundational tech components. For example, the platform seamlessly integrates with the bank's core systems to retrieve and update borrower information in real-time via the functional services component 314. The common data model component 316 enables systemic tracking and reporting of key information while removing reliance on manual data aggregation. For instance, the platform uses a standardized data model to track loan application statuses and generate comprehensive reports via the common data model component 316, enhancing transparency and accountability. By incorporating these components, the universal workflow platform enhances the efficiency, accuracy, and user experience of wholesale lending processes, ultimately supporting the strategic goals of an institution, such as a bank, deploying the platform and improving service delivery by the institution.

Figure 4:
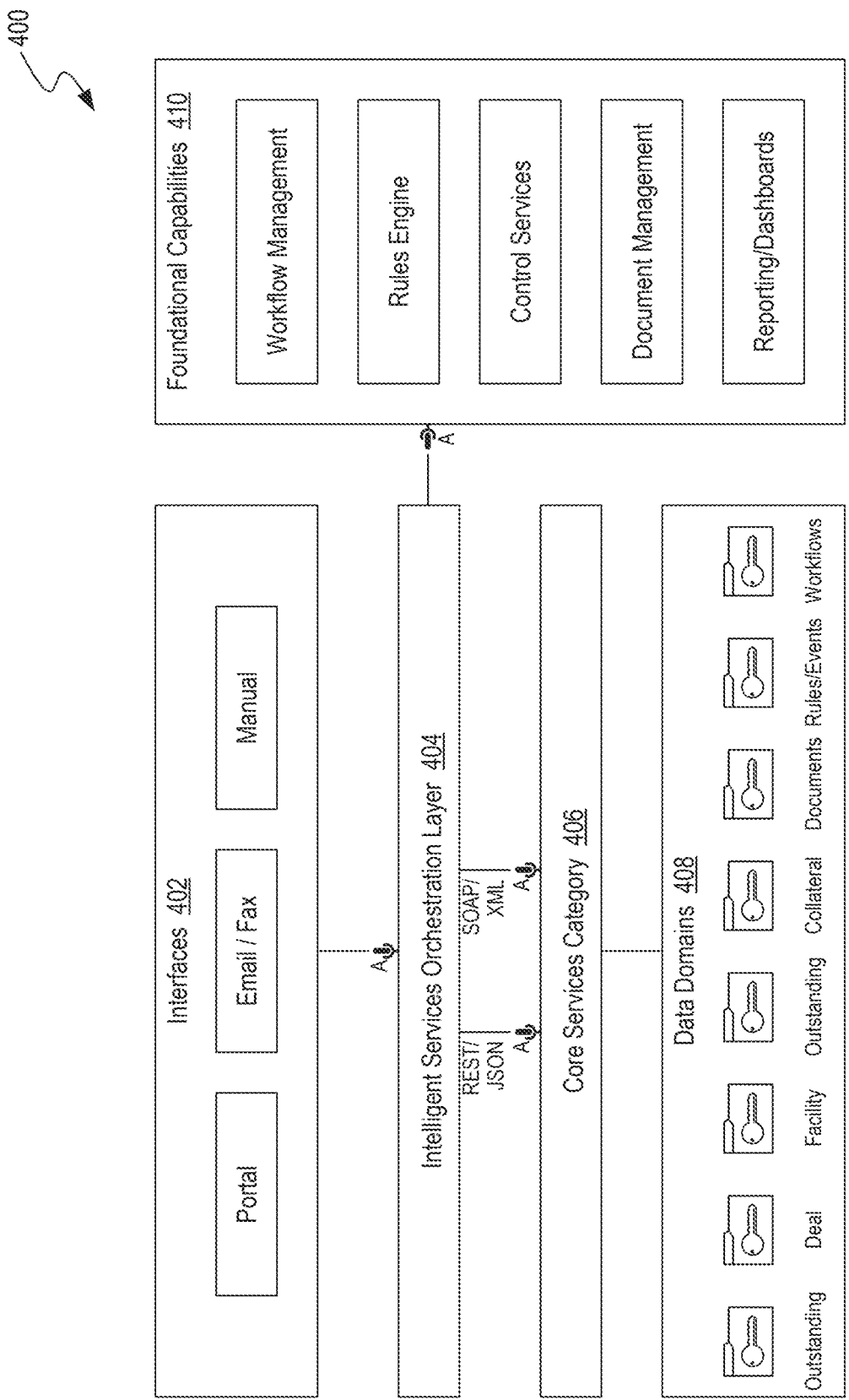
FIG. 4 is another block diagram illustrating example data flow for a universal workflow platform in some implementations of the present technology.

FIG. 4 is a block diagram 400 illustrating an example data flow for a universal workflow platform in some implementations of the present technology. This block diagram serves as a template that describes the various components leveraged throughout the architecture designs. It provides context to different aspects of the architecture to help orient on the design patterns utilized across lower-level architectures. The interfaces component 402 includes a common portal for internal and external users to submit requests or updates, driving a consistent user experience across channels and faster time to market. For example, a user can access the portal to submit an account information change request, which is then processed uniformly regardless of whether the request comes from an internal employee or an external client. The intelligent services orchestration layer component 404 includes standard containerized interactions across technical components, preventing changes to underlying components from impacting the broader ecosystem. For instance, when an account information change request is submitted, it is directed through the intelligent services orchestration layer to initiate core services and foundational capabilities without disrupting other system functions. The core services category component 406 includes shared technology services that support broader business functions and promote reuse. For example, a client/lender information service is utilized to pass data across interfaces, foundational capabilities, and data domains, ensuring that information is consistently and accurately shared throughout the system. The data domains component 408 ensures that data is sourced directly from master locations, eliminating data duplication, required controls, and inefficiencies. For example, client/lender contact details are sourced and updated in a single master location via the data domains component 408, ensuring that all users and systems access the most current and accurate information.

The foundational capabilities component 410 includes several subcomponents: workflow management, rules engine, control services, document management, and reporting/dashboards. The workflow management subcomponent includes configurable workflows that support business events, functions, and approvals, streamlining and automating repeatable business processes, and enabling central control and reporting. For example, a loan approval process can be automated and tracked through a configurable workflow via the workflow management subcomponent, ensuring consistency and efficiency. The rules engine subcomponent includes rules that support business processes, policies, and data, decoupling business and technical logic to promote efficient change management. For instance, loan eligibility criteria can be updated in the rules engine without requiring changes to the underlying system code. The control services subcomponent includes automated entitlements, data quality, and exception management deployed across the architecture, resulting in an efficient control framework implementation. For example, automated checks ensure that only authorized users can access sensitive data, and any data quality issues are flagged and managed promptly via the control services subcomponent. The document management subcomponent includes a single service for received and generated documents, fully integrating documents across lending and workflow services. For example, all loan-related documents are stored and managed in a centralized system via the document management subcomponent, making the documents easily accessible for review and compliance purposes. The reporting/dashboards subcomponent includes centralized reporting that sources data from master data locations, enhancing reporting capabilities while ensuring a common experience and enabling self-service. For example, stakeholders can generate real-time reports on loan processing metrics directly from the dashboard via the reporting/dashboards subcomponent, using data sourced from the master locations to ensure accuracy and consistency.

Figure 5:
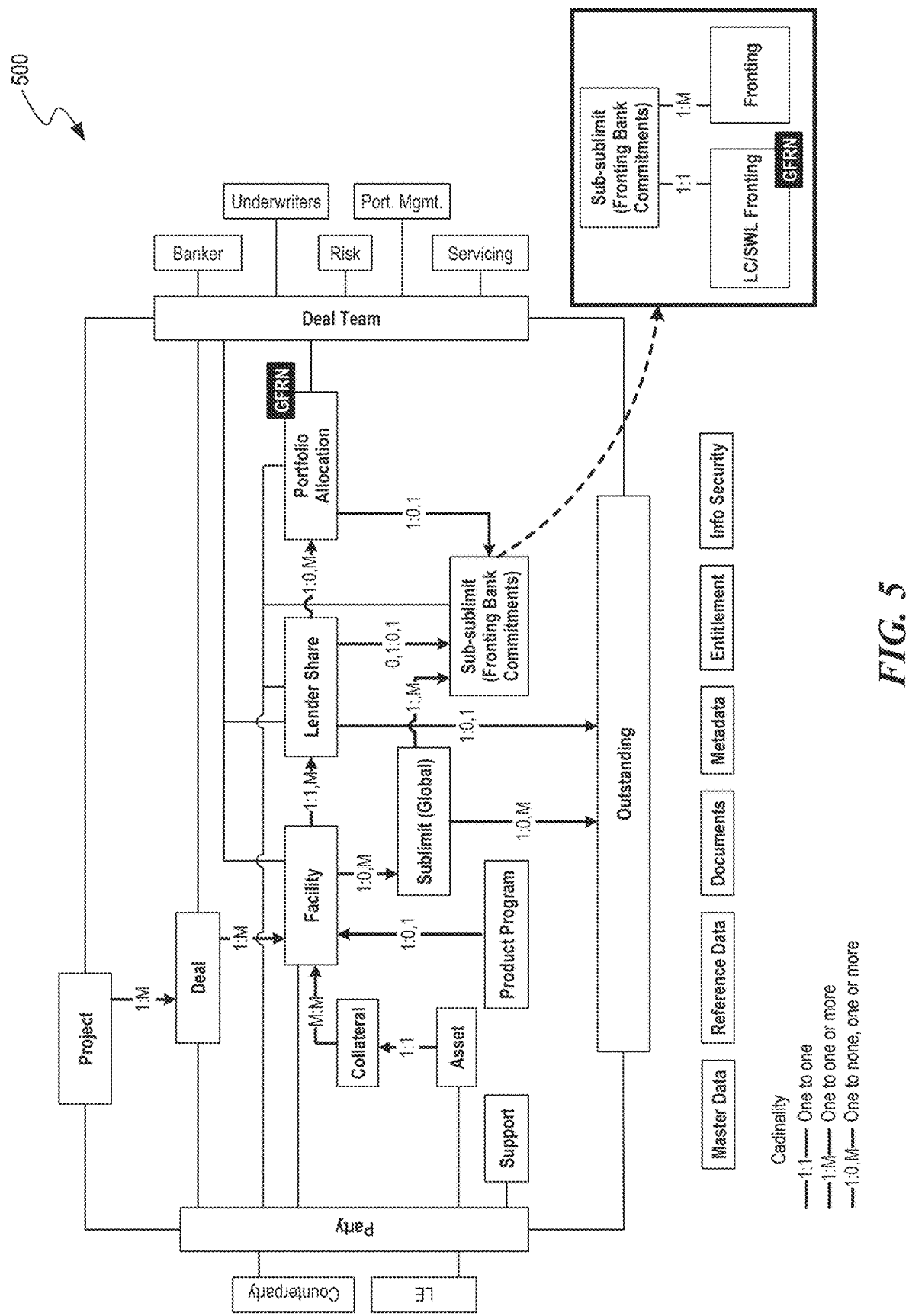
FIG. 5 is yet another block diagram illustrating example data flow for a universal workflow platform in some implementations of the present technology.

FIG. 5 is a block diagram 500 illustrating an example data flow for a universal workflow platform in some implementations of the present technology. This view highlights the key logical data structures across wholesale lending. The high-level concepts and relationships depicted are foundational to the wholesale lending data model and are utilized across various functions, including underwriting, origination, servicing, monitoring, and credit management. For example, in the underwriting phase, the data model includes structures for capturing borrower information, credit scores, and risk assessments. These data points are crucial for evaluating the creditworthiness of a borrower and making informed lending decisions. During the origination phase, the data model supports the collection and processing of loan applications, including the necessary documentation and approval workflows. This configuration ensures that all required information is accurately captured and processed efficiently. In the servicing phase, the data model includes structures for managing loan accounts, payment schedules, and transaction histories. This configuration allows for effective tracking and management of loan repayments, ensuring that any issues are promptly addressed. The monitoring phase leverages the data model to track the performance of loans and identify potential risks. For instance, the system can monitor changes in the borrower's financial status or external economic conditions that might impact loan repayment. Finally, in the credit management phase, the data model supports the ongoing assessment and management of credit risk. This configuration provides for updating of borrower profiles, adjusting of credit limits, and managing of collateral. By utilizing a consistent and comprehensive data model across all these functions, the universal workflow platform ensures that information is accurately shared and integrated, supporting effective decision-making and risk management throughout the wholesale lending process.

Figure 6:
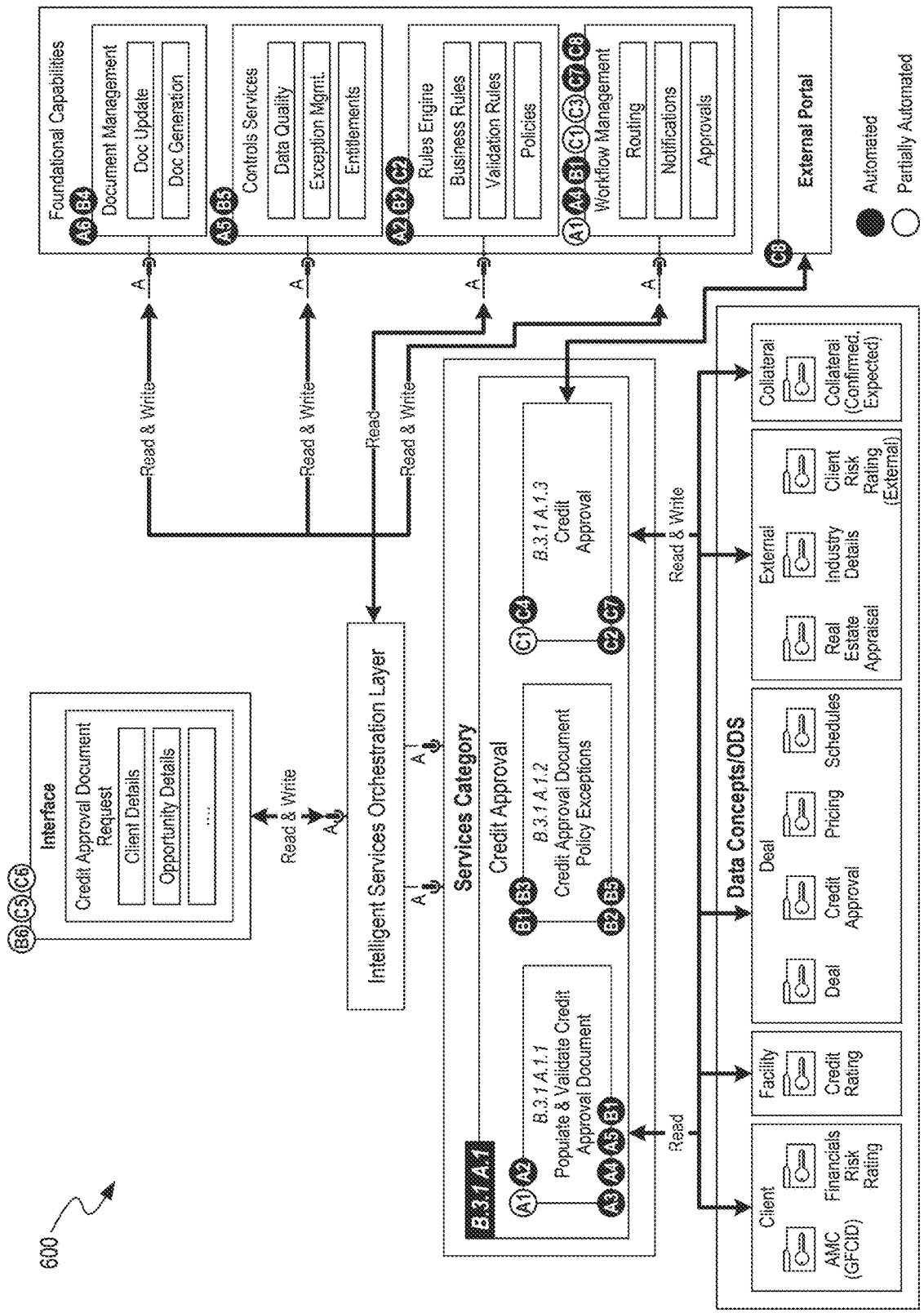
FIG. 6 is yet another block diagram illustrating example data flow for a universal workflow platform in some implementations of the present technology.

FIG. 6 is a block diagram 600 illustrating an example data flow for a universal workflow platform in some implementations of the present technology. In this example, after deal terms are finalized by a relationship manager, the underwriter submits a request to the workflow platform to populate a credit approval template. In Section A, the process begins with Step A1, where workflow management sends a request to populate and validate the credit approval document service to get the template with pre-filled data. In Step A2, the rules engine determines the respective credit approval document fields that need to be populated as per policy. Step A3 involves extracting and pre-filling relevant data related to company/industry analysis, financial analysis, collateral analysis, exposures, obligor and facility risk ratings, deal terms, and capital analysis for the respective sections. Once the template is populated, Step A4 triggers a notification to the relationship manager and underwriter for any additional updates. Step A5 validates the completeness of the updated credit approval document, and in Step A6, the document management service is leveraged to generate and store the updated credit approval document.

In Section B, the focus shifts to handling credit approval document policy exceptions. Step B1 triggers an event to the exceptions service to identify credit approval document policy exceptions. In Step B2, the applicable policy-based exception rules and approvals are fetched from the rules engine. Step B3 identifies any deviations or exceptions against the credit approval document based on the rules collected from the previous step. These identified deviations and exceptions are stored in document management in Step B4. Step B5 validates whether an exception is permissible based on policies, and in Step B6, the underwriter reviews and validates all approvals and required documentation.

Section C deals with the credit approval process. In Step C1, workflow management sends a request to the rules engine to identify the reviewers and approvers details. The rules engine determines the credit approval document approvals needed based on business rules in Step C2. The request is routed to the senior manager and other personnel in Step C3. Step C4 involves sending a request to the credit approval service to fetch the risk appetite, policies, exceptions, underwriting package, and credit analysis data for credit decisioning. Senior personnel provide their credit decision (approve, approve with contingency, or deny) based on data from the credit approval service to the relationship manager via notification in Step C5. If the deal is approved with contingencies or denied, the underwriter updates the credit approval document and performs a final check to verify all the approvals in Step C6. If the credit approval document is modified in the previous step, the workflow reinitiates the approval process based on the business rules in Step C7. Finally, in Step C8, a notification and relevant underwriting documents are sent to the client portal on the credit decision, and the client's intent to proceed to the deal closing process is confirmed.

Machine Learning Model(s) of the Example Distributed System(s)

Figure 7:
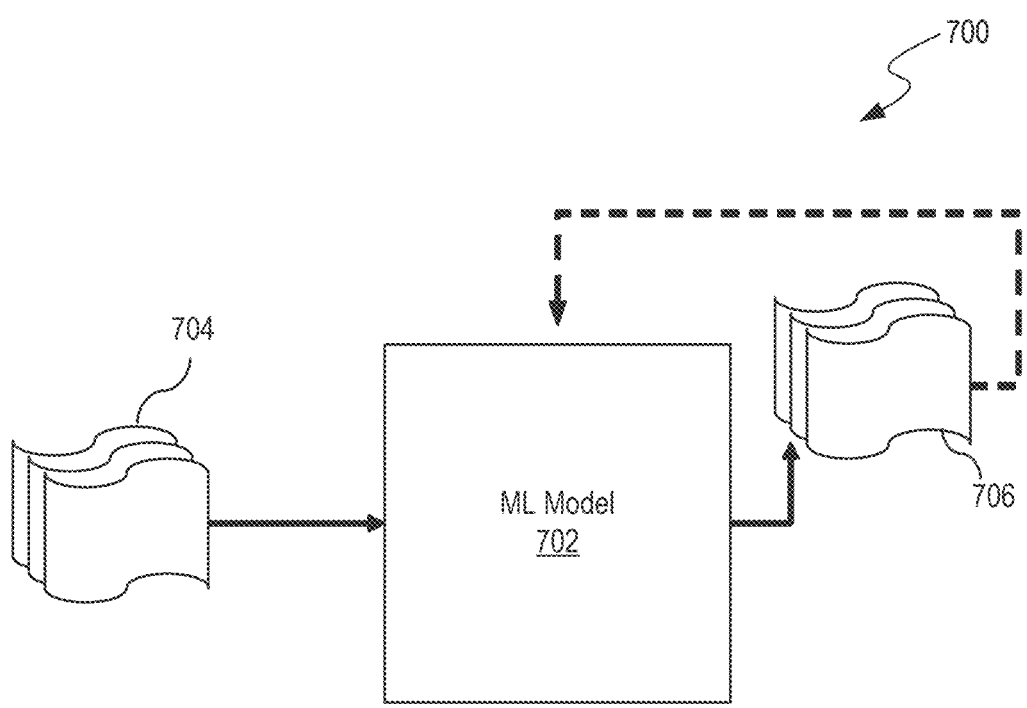
FIG. 7 is a block diagram illustrating an example machine learning model of a computing environment in which the disclosed system operates in some implementations of the present technology.

FIG. 7 is a block diagram 700 illustrating an example machine learning model 702 of a computing environment in which the disclosed system operates in some implementations of the present technology. According to various implementations, the described systems can include one or more machine learning models. The machine learning models can be structured to perform any suitable artificial intelligence-based operations to perform end-to-end traceability of software feature changes for various computing systems within an organization and/or the like. Machine learning models can include one or more convolutional neural networks (CNN), deep learning (DL) models, translational models, natural language processing (NLP) models, computer vision-based models, decision trees, Bayesian models, generative models, or any other suitable models for enabling the operations described herein.

In some implementations, the machine learning models, such as the machine learning model 702, can include one or more neural networks. As an example, neural networks may be based on a large collection of neural units (or artificial neurons). Neural networks may loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit may have a summation function which combines the values of all its inputs together. In some embodiments, each connection (or the neural unit itself) may have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, back propagation techniques may be utilized by the neural networks, where forward stimulation is used to reset weights on the "front" neural units. In some implementations, stimulation and inhibition for neural networks may be more free-flowing, with connections interacting in a more chaotic and complex fashion.

As an example, machine learning model 702 can ingest inputs 704 and provide outputs 706. In one use case, outputs 706 can be fed back to a machine learning model as inputs to train the machine learning model (e.g., alone or in conjunction with user indications of the accuracy of outputs, labels associated with the inputs, or with other reference feedback information). In another use case, a machine learning model 702 can update its configurations (e.g., weights, biases, or other parameters) based on its assessment of its prediction (e.g., outputs 706) and reference feedback information (e.g., user indication of accuracy, reference labels, or other information). In another use case, where a machine learning model 702 is a neural network, connection weights can be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this manner, for example, the machine learning model 702 may be trained to generate better predictions.

As an example, where the prediction models include a neural network, the neural network can include one or more input layers, hidden layers, and output layers. The input and output layers can respectively include one or more nodes, and the hidden layers may each include a plurality of nodes. When an overall neural network includes multiple portions trained for different objectives, there may or may not be input layers or output layers between the different portions. The neural network can also include different input layers to receive various input data. Also, in differing examples, data can input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

According to various implementations, machine learning models can be trained based on information stored in a local data store associated with the described systems and/or an associated remote data store.

Example Architecture(s) of the Example Distributed System(s)

Figure 8:
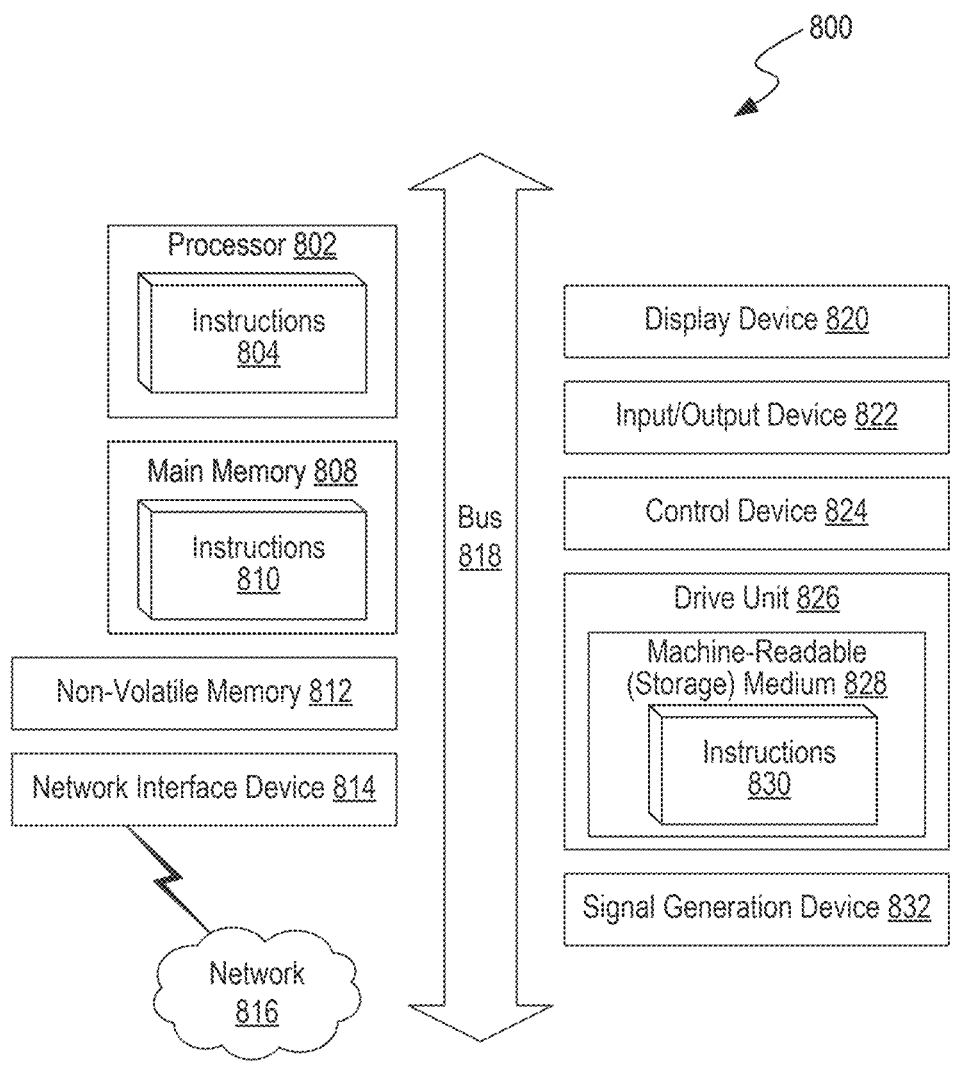
FIG. 8 is a block diagram illustrating an example of a computing environment in which the disclosed system operates in some implementations of the present technology.

FIG. 8 is a block diagram illustrating an example of a computing environment 800 in which the disclosed system operates in some implementations of the present technology. In various implementations, these computer systems and other devices can include server computer systems, desktop computer systems, laptop computer systems, netbooks, mobile phones, personal digital assistants, televisions, cameras, automobile computers, electronic media players, etc. In various implementations, the computer systems and devices include zero or more of each of the following: a processor or a central processing unit (CPU) 802 for executing computer programs, e.g., instructions 804; a computer memory 808 for storing programs and data, e.g., instructions 810, while they are being used, including the facility and associated data, an operating system including a kernel, and device drivers; a persistent storage device or a non-volatile memory 812, such as a hard drive or flash drive for persistently storing programs and data; a drive unit 826 including computer-readable media drives 828 that are tangible storage means that do not include a transitory, propagating signal, such as a floppy, CD-ROM, or DVD drive, for reading programs and data, e.g., instructions 830, stored on a computer-readable medium; a network interface device 814 with a network connection 816 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like; a bus 818; a display device 820; an input/output device 822; a control device 824; and a signal generation device 832. While computer systems configured as described above are typically used to support the operation of a facility, those skilled in the art will appreciate that the facility may be implemented using devices of various types and configurations, and having various components.

Figure 9:
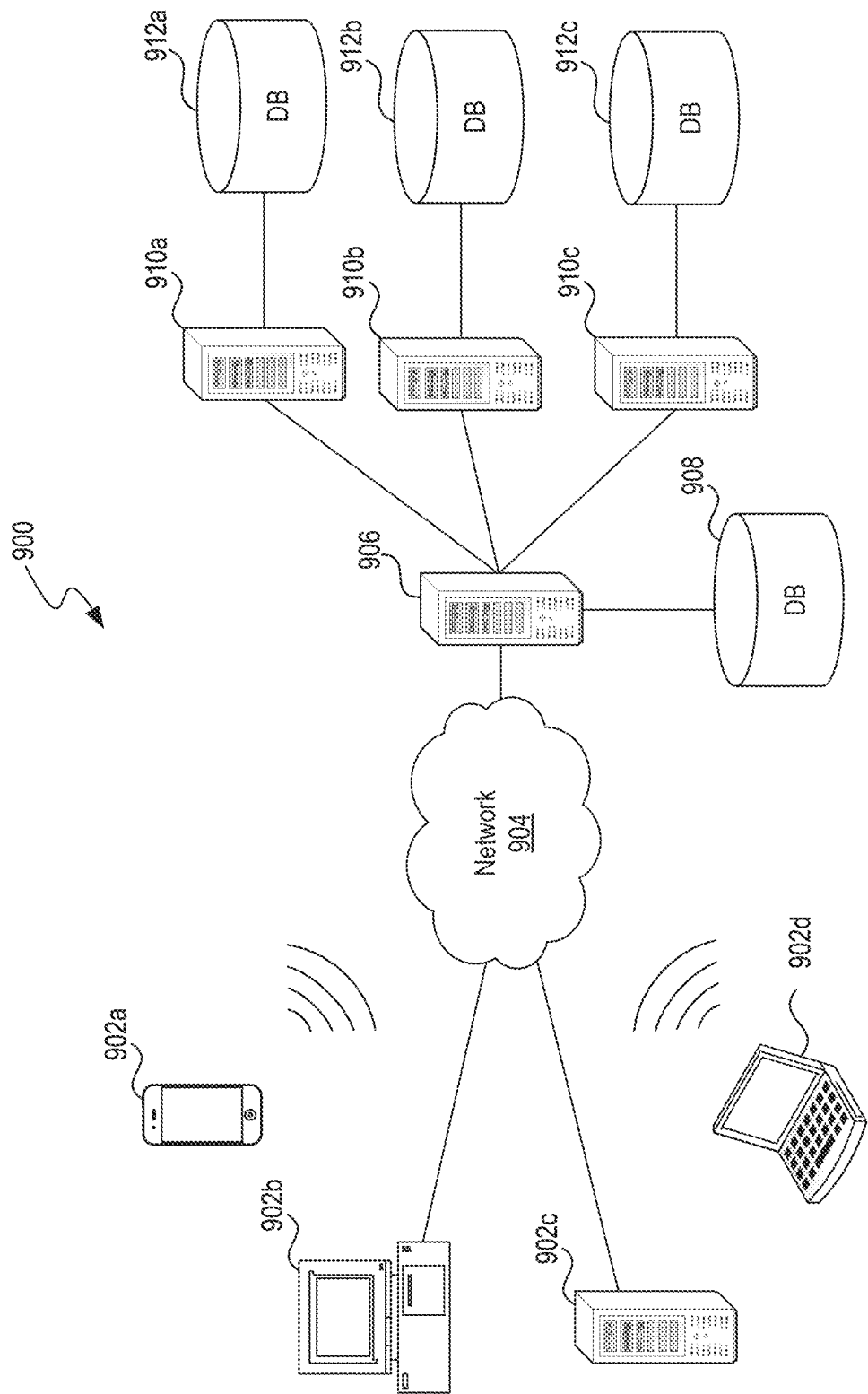
FIG. 9 is a system diagram showing some of the components typically incorporated in at least some of the computer systems and other devices on which the disclosed system operates in accordance with some implementations of the present technology.

FIG. 9 is a system diagram showing some of the components typically incorporated in at least some of the computer systems and other devices on which the disclosed system operates in accordance with some implementations of the present technology. In some implementations, environment 900 includes one or more client computing devices 902A-D, examples of which can host the described systems. Client computing devices 902A-D operate in a networked environment using logical connections through network 904 to one or more remote computers, such as a server computing device.

In some implementations, server 906 is an edge server which receives client requests and coordinates fulfillment of those requests through other servers, such as servers 910A-C. In some implementations, server 906 connects to a corresponding database 908. In some implementations, server computing devices 910A-C comprise computing systems. Though each server computing device 910A-C is displayed logically as a single server, server computing devices can each be a distributed computing environment encompassing multiple computing devices located at the same or at geographically disparate physical locations. In some implementations, each server 910A-C corresponds to a group of servers.

Client computing devices 902A-D and server computing devices 910A-C can each act as a server or client to other server or client devices. In some implementations, servers 910A-C connect to a corresponding database 912A-C. As discussed above, each server 910A-C can correspond to a group of servers, and each of these servers can share a database or can have its own database. Databases 912A-C warehouse (e.g., store) information such items included in various data streams. Though databases 912A-C are displayed logically as single units, databases 912A-C can each be a distributed computing environment encompassing multiple computing devices, can be located within their corresponding server, or can be located at the same or at geographically disparate physical locations.

Network 904 can be a local area network (LAN) or a wide area network (WAN), but can also be other wired or wireless networks. In some implementations, network 904 is the Internet or some other public or private network. Client computing devices 902A-D are connected to network 904 through a network interface, such as by wired or wireless communication. While the connections between server 906 and servers 910A-C are shown as separate connections, these connections can be any kind of local, wide area, wired, or wireless network, including network 904 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a non-transitory computer-readable media claim, other aspects may likewise be embodied as a non-transitory computer-readable media claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. One or more non-transitory computer-readable media storing instructions for an event-driven resource execution architecture, the instructions, when executed by at least one processor, cause the at least one processor to perform operations comprising:
   receiving a resource request including a first plurality of parameters;
   based on the first plurality of parameters, selecting, from a plurality of workflow templates, a first workflow template suitable for executing the resource request;
   providing, based on the first workflow template, a first workflow instance including a first plurality of microservices for executing the resource request;
   performing the first workflow instance for executing the resource request;
   subsequent to executing a subset of the first plurality of microservices, receiving a modified resource request including a second plurality of parameters;
   pausing the first workflow instance for executing the resource request;
   while the first workflow instance is paused:
      based on the second plurality of parameters, selecting, from the plurality of workflow templates, a second workflow template suitable for executing the modified resource request;
      providing, based on the second workflow template, a second workflow instance including a second plurality of microservices for executing the modified resource request;
      determining overlapping microservices of the subset of the first plurality of microservices and the second plurality of microservices;
      based on the overlapping microservices:
         assigning a first set of outputs, generated by executing the subset of the first plurality of microservices, that is reused for executing the overlapping microservices of the second plurality of microservices, to the overlapping microservices of the second plurality of microservices, thereby preventing execution of the overlapping microservices;
         discarding a second set of outputs, generated by executing the subset of the first plurality of microservices, that cannot be reused for executing the overlapping microservices of the second plurality of microservices;
   performing the second workflow instance for executing the modified resource request; and
   subsequent to completing the second workflow instance, resuming the first workflow instance.

2. The one or more non-transitory computer-readable media of claim 1, wherein the operations further comprise at least one of:
   determining a state of available resources for servicing resource requests,
   determining a request history of a user submitting the resource request, or
   determining an account status of the user in anticipation of executing the resource request.

3. The one or more non-transitory computer-readable media of claim 1, wherein determining overlapping microservices of the first plurality of microservices and the second plurality of microservices comprises:
   using a machine learning model, obtaining user input to assess overlapping microservices of the first plurality of microservices and the second plurality of microservices.

4. The one or more non-transitory computer-readable media of claim 1, wherein determining overlapping microservices of the subset of the first plurality of microservices and the second plurality of microservices comprises:
   determining microservices whose output does not change based on the second plurality of parameters of the modified resource request.

5. A method for an event-driven architecture for executing resource requests, the method comprising:
   receiving a resource request including a first plurality of parameters;

based on the first plurality of parameters, selecting, from a plurality of workflow templates, a first workflow template suitable for executing the resource request;

providing, based on the first workflow template, a first workflow instance including a first plurality of microservices for executing the resource request;

performing the first workflow instance for executing the resource request;

subsequent to executing a subset of the first plurality of microservices, receiving a modified resource request including a second plurality of parameters;

pausing the first workflow instance for executing the resource request;

based on the second plurality of parameters, selecting, from the plurality of workflow templates, a second workflow template suitable for executing the modified resource request;

providing, based on the second workflow template, a second workflow instance including a second plurality of microservices for executing the modified resource request;

determining overlapping microservices of the subset of the first plurality of microservices and the second plurality of microservices;

based on the overlapping microservices, assigning a first set of outputs, generated by executing the subset of the first plurality of microservices, that is reused for executing the overlapping microservices of the second plurality of microservices, to the overlapping microservices of the second plurality of microservices, thereby preventing execution of the overlapping microservices; and performing the second workflow instance for executing the modified resource request.

6. The method of claim 5, further comprising:
based on the overlapping microservices, discarding a second set of outputs, generated by executing the subset of the first plurality of microservices, that cannot be reused for executing the overlapping microservices of the second plurality of microservices.

7. The method of claim 5, further comprising at least one of:
determining a state of available resources for servicing resource requests,
determining a request history of a user submitting the resource request, or
determining an account status of the user in anticipation of executing the resource request.

8. The method of claim 5, wherein determining overlapping microservices of the first plurality of microservices and the second plurality of microservices comprises:
using a machine learning model, obtaining user input to assess overlapping microservices of the first plurality of microservices and the second plurality of microservices.

9. The method of claim 5, wherein determining overlapping microservices of the subset of the first plurality of microservices and the second plurality of microservices comprises:
determining microservices whose output does not change based on the second plurality of parameters of the modified resource request.

10. The method of claim 5, wherein selecting, from the plurality of workflow templates, the second workflow template suitable for executing the modified resource request comprises:

dynamically generating the second workflow template based on the modified resource request.

11. The method of claim 10, wherein dynamically generating the second workflow template based on the modified resource request includes determining the second plurality of microservices based on the second plurality of parameters included in the modified resource request.

12. A system comprising at least one processor and one or more non-transitory computer-readable media having instructions stored thereon that, when executed by the at least one processor, cause the at least one processor to perform operations comprising:
based on a first plurality of parameters included in a resource request, providing and performing a first workflow instance including a first plurality of microservices for executing the resource request;

subsequent to executing a subset of the first plurality of microservices, receiving a modified resource request including a second plurality of parameters;

pausing the first workflow instance for executing the resource request;

based on the second plurality of parameters, providing a second workflow instance including a second plurality of microservices for executing the modified resource request;

determining overlapping microservices of the subset of the first plurality of microservices and the second plurality of microservices;

based on the overlapping microservices, assigning a first set of outputs generated by executing the subset of the first plurality of microservices that is reused for executing the overlapping microservices of the second plurality of microservices, to the overlapping microservices of the second plurality of microservices; and performing the second workflow instance for executing the modified resource request, wherein based on the first plurality of parameters included in the resource request, providing the first workflow instance including the first plurality of microservices for executing the resource request comprises:
based on the first plurality of parameters, selecting, from a plurality of workflow templates, a first workflow template suitable for executing the resource request; and
providing, based on the first workflow template, the first workflow instance including the first plurality of microservices for executing the resource request; and wherein based on the second plurality of parameters, providing the second workflow instance including the second plurality of microservices for executing the modified resource request comprises:
based on the second plurality of parameters, selecting, from the plurality of workflow templates, a second workflow template suitable for executing the modified resource request; and
providing, based on the second workflow template, the second workflow instance including the second plurality of microservices for executing the modified resource request.

13. The system of claim 12, wherein selecting, from the plurality of workflow templates, the first workflow template suitable for executing the resource request comprises:
dynamically generating the first workflow template based on the resource request.

14. The system of claim 13, wherein dynamically generating the first workflow template based on the resource request includes determining the first plurality of microservices based on the first plurality of parameters included in the resource request.

15. A system comprising at least one processor and one or more non-transitory computer-readable media having instructions stored thereon that, when executed by the at least one processor, cause the at least one processor to perform operations comprising:
based on a first plurality of parameters included in a resource request, providing and performing a first workflow instance including a first plurality of microservices for executing the resource request;
subsequent to executing a subset of the first plurality of microservices, receiving a modified resource request including a second plurality of parameters;
pausing the first workflow instance for executing the resource request;
based on the second plurality of parameters, providing a second workflow instance including a second plurality of microservices for executing the modified resource request;
determining overlapping microservices of the subset of the first plurality of microservices and the second plurality of microservices;
based on the overlapping microservices, assigning a first set of outputs generated by executing the subset of the first plurality of microservices that is reused for executing the overlapping microservices of the second plurality of microservices, to the overlapping microservices of the second plurality of microservices;
performing the second workflow instance for executing the modified resource request; and
based on the overlapping microservices of the subset of the first plurality of microservices and the second plurality of microservices:
determining a second set of outputs generated by executing the subset of the first plurality of microservices that cannot be reused for executing the overlapping microservices of the second plurality of microservices, and
discarding the second set of outputs generated by executing the subset of the first plurality of microservices.

16. A system comprising at least one processor and one or more non-transitory computer-readable media having instructions stored thereon that, when executed by the at least one processor, cause the at least one processor to perform operations comprising:
based on a first plurality of parameters included in a resource request, providing and performing a first workflow instance including a first plurality of microservices for executing the resource request;
subsequent to executing a subset of the first plurality of microservices, receiving a modified resource request including a second plurality of parameters;
pausing the first workflow instance for executing the resource request;
based on the second plurality of parameters, providing a second workflow instance including a second plurality of microservices for executing the modified resource request;
determining overlapping microservices of the subset of the first plurality of microservices and the second plurality of microservices;
based on the overlapping microservices, assigning a first set of outputs generated by executing the subset of the first plurality of microservices that is reused for executing the overlapping microservices of the second plurality of microservices, to the overlapping microservices of the second plurality of microservices; and
performing the second workflow instance for executing the modified resource request, wherein the operations further comprise at least one of:
determining a state of available resources for servicing resource requests,
determining a request history of a user submitting the resource request, or
determining an account status of the user in anticipation of executing the resource request.

17. A system comprising at least one processor and one or more non-transitory computer-readable media having instructions stored thereon that, when executed by the at least one processor, cause the at least one processor to perform operations comprising:
based on a first plurality of parameters included in a resource request, providing and performing a first workflow instance including a first plurality of microservices for executing the resource request;
subsequent to executing a subset of the first plurality of microservices, receiving a modified resource request including a second plurality of parameters;
pausing the first workflow instance for executing the resource request;
based on the second plurality of parameters, providing a second workflow instance including a second plurality of microservices for executing the modified resource request;
determining overlapping microservices of the subset of the first plurality of microservices and the second plurality of microservices;
based on the overlapping microservices, assigning a first set of outputs generated by executing the subset of the first plurality of microservices that is reused for executing the overlapping microservices of the second plurality of microservices, to the overlapping microservices of the second plurality of microservices; and
performing the second workflow instance for executing the modified resource request,
wherein determining overlapping microservices of the first plurality of microservices and the second plurality of microservices comprises:
using a machine learning model, obtaining user input to assess overlapping microservices of the first plurality of microservices and the second plurality of microservices.

18. A system comprising at least one processor and one or more non-transitory computer-readable media having instructions stored thereon that, when executed by the at least one processor, cause the at least one processor to perform operations comprising:
based on a first plurality of parameters included in a resource request, providing and performing a first workflow instance including a first plurality of microservices for executing the resource request;
subsequent to executing a subset of the first plurality of microservices, receiving a modified resource request including a second plurality of parameters;
pausing the first workflow instance for executing the resource request;
based on the second plurality of parameters, providing a second workflow instance including a second plurality of microservices for executing the modified resource request;

determining overlapping microservices of the subset of the first plurality of microservices and the second plurality of microservices;

based on the overlapping microservices, assigning a first set of outputs generated by executing the subset of the first plurality of microservices that is reused for executing the overlapping microservices of the second plurality of microservices, to the overlapping microservices of the second plurality of microservices; and performing the second workflow instance for executing the modified resource request, wherein determining the overlapping microservices of the subset of the first plurality of microservices and the second plurality of microservices comprises:

determining microservices whose output does not change based on the second plurality of parameters of the modified resource request.

* * * * *